United States Patent
Xu et al.

(10) Patent No.: US 11,206,193 B2
(45) Date of Patent: Dec. 21, 2021

(54) METHOD AND SYSTEM FOR PROVISIONING RESOURCES IN CLOUD COMPUTING

(71) Applicant: Futurewei Technologies, Inc., Plano, TX (US)

(72) Inventors: Wei Xu, Dublin, CA (US); Yan Sun, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 530 days.

(21) Appl. No.: 15/807,912

(22) Filed: Nov. 9, 2017

(65) Prior Publication Data
US 2019/0140918 A1   May 9, 2019

(51) Int. Cl.
*H04L 12/24* (2006.01)
*G06F 9/50* (2006.01)
(Continued)

(52) U.S. Cl.
CPC ...... *H04L 41/5003* (2013.01); *G06F 9/45558* (2013.01); *G06F 9/5077* (2013.01);
(Continued)

(58) Field of Classification Search
CPC ... H04L 41/5003; H04L 43/08; H04L 47/823; H04L 67/2842; G06F 9/45558; G06F 9/5077
See application file for complete search history.

(56) References Cited

U.S. PATENT DOCUMENTS 9,411,725 B2 *   8/2016   Gasparakis ......... G06F 12/0802
9,921,866 B2 *   3/2018   Ganguli ............... G06F 9/5055
(Continued)

FOREIGN PATENT DOCUMENTS

| CN | 102014159 A | 4/2011 |
| CN | 103649910 A | 3/2014 |
| CN | 106712998 A | 5/2017 |

OTHER PUBLICATIONS

Ali Ghodsi et al., Dominant resource fairness: fair allocation of multiple resource types. In Proceedings of the 8th USENIX conference on Networked systems design and implementation (NSDI) Boston, MA, 2011, 14 pages.
(Continued)

*Primary Examiner* — Esther B. Henderson
*Assistant Examiner* — Nazia Naoreen
(74) *Attorney, Agent, or Firm* — Schwegman Lundberg & Woessner, P.A.

(57) ABSTRACT

Embodiments provide methods and apparatuses of allocating resources in a network of computing service nodes to applications. Based on a first service level agreement (SLA) for a first application, a number of physical central processing unit cores and respective quantities of additional physical resources needed are determined to satisfy the first SLA; one or more of the service nodes are selected that collectively have available the number of physical CPU cores and the respective quantities of the one or more additional physical resources wherein the one or more additional physical resources comprise a last level cache (LLC); a first virtual machine on one of the selected service nodes is allocated for the first application; the number of physical CPU cores and the respective quantities of the one or more additional physical resources on the selected service nodes are reserved for use by the first virtual machine.

20 Claims, 7 Drawing Sheets

(51) Int. Cl.
  *G06F 9/455* (2018.01)
  *H04L 29/08* (2006.01)
  *H04L 12/26* (2006.01)
  *H04L 12/911* (2013.01)

(52) U.S. Cl.
  CPC ............ *H04L 43/08* (2013.01); *H04L 47/823* (2013.01); *H04L 67/2842* (2013.01); *G06F 2009/4557* (2013.01); *G06F 2009/45595* (2013.01); *H04L 67/10* (2013.01)

(56) References Cited

U.S. PATENT DOCUMENTS

| | | | |
|---|---|---|---|
| 10,742,522 B2 * | 8/2020 | Senarath | H04L 41/5003 |
| 2008/0295096 A1 * | 11/2008 | Beaty | G06F 9/5077 718/1 |
| 2010/0235836 A1 * | 9/2010 | Bratanov | G06F 11/3466 718/1 |
| 2013/0132561 A1 * | 5/2013 | Pasala | H04L 67/1097 709/224 |
| 2013/0304923 A1 | 11/2013 | Clay et al. | |
| 2014/0149986 A1 | 5/2014 | Prakash et al. | |

OTHER PUBLICATIONS

Zhiming Shen et al., Cloudscale: elastic resource scaling for multi-tenant cloud systems. In Proceedings of SOCC. Cascais, Portugal, 2011, 14 pages.

Nedeljko Vasic et al., Dejavu: accelerating resource allocation in virtualized environments. In Proceedings of the Seventeenth International Conference on Architectural Support for Programming Languages and Operating Systems (ASPLOS). London, UK, 2012, 13 pages.

Xiaoyun Zhu et al., 1000 islands: An integrated approach to resource management for virtualized data centers. Journal of Cluster Computing, vol. 12, 2009. 13 pages.

Daniel Gmach et al., Workload analysis and demand prediction of enterprise data center applications. In Proceedings of IISWC. Boston, MA, 2007. 10 pages.

Alexey Tumanov et al., Tetrisched: Space-Time Scheduling for Heterogeneous Datacenters. Tech. rep. Carnegie Mellon University, 2013. 27 pages.

Matthew P. Grosvenor et al., Queues don't matter when you can jump them! In USENIX NSDI, 2015. 15 pages.

Keon Jang et al., Silo: Predictable message latency in the cloud. In ACM SIGCOMM, pp. 435-448. ACM, 2015. 14 pages.

* cited by examiner

METHOD AND SYSTEM FOR PROVISIONING RESOURCES IN CLOUD COMPUTING

TECHNICAL FIELD

The present disclosure generally relates to cloud computing, and more specifically to a method and system for provisioning resources in cloud computing.

BACKGROUND

Cloud computing has become a popular technology that has huge potentials in enterprises and markets. Cloud computing makes it possible to access applications and associated data from anywhere. Companies are able to rent resources from cloud computing systems for storage and other computational purposes so that their infrastructure cost can be reduced significantly. However, one of the major pitfalls in cloud computing is related to optimizing the resources being allocated to application programs. One of the challenges of resource allocation is to provide reliable, customized and QoS (Quality of Service) guaranteed computing dynamic environments for users.

SUMMARY

An example embodiment includes a method for allocating resources in a network of computing service nodes to applications implemented by a controller, the method includes determining, based on a first service level agreement (SLA) for a first application, a number of physical central processing unit (CPU) cores and respective quantities of one or more additional physical resources needed to satisfy the first SLA; selecting one or more of the service nodes that collectively have available the number of physical CPU cores and the respective quantities of the one or more additional physical resources wherein the one or more additional physical resources comprise a last level cache (LLC); allocating a first virtual machine on one of the selected service nodes for the first application; reserving the number of physical CPU cores and the respective quantities of the one or more additional physical resources on the selected service nodes for use by the first virtual machine such that no other virtual machines allocated on the service nodes can utilize the reserved resources.

Optionally, in any of the preceding embodiments, wherein the additional physical resource further comprise dynamic random access memory (DRAM) bandwidth, an L1 cache, an L2 cache, an L3 cache, a last level cache (LLC), or disk bandwidth.

Optionally, in any of the preceding embodiments, wherein the SLA specifies one or more of: requests per second, network latency, DRAM bandwidth, Disk bandwidth or Network bandwidth.

Optionally, in any of the preceding embodiments, wherein after reserving the number of physical CPU cores and the respective quantities of the one or more additional physical resources, determining that performance of the first application does not satisfy the first SLA and, based thereon, reserving an additional physical CPU core or an additional physical resource for use exclusively by the first virtual machine.

Optionally, in any of the preceding embodiments, wherein the first virtual machine and the second virtual machine are allocated on a same service node.

Optionally, in any of the preceding embodiments, wherein determining further includes collecting parameters of the resources usage in executing the first application, comparing the collected parameters to the first SLA; calculating predicted resources needed for the first application; wherein the predicted resources comprise the number of physical central processing unit (CPU) cores and respective quantities of the one or more additional physical resources needed to satisfy the first SLA.

Optionally, in any of the preceding embodiments, wherein determining further includes recalculating the predicted resources needed for the first application; releasing former resources allocation to be available by the second application; and reallocating resources based on the results of the recalculation in addition to the first SLA.

Optionally, in any of the preceding embodiments, wherein the method further include reserving all necessary physical resources as well as virtual resources exclusively for the first application.

An example embodiment includes a controller apparatus in a network of computing service nodes to applications, the apparatus includes a memory storing instructions; and one or more processors coupled to the memory, wherein the one or more processors execute the instructions to: determine based on a first service level agreement (SLA) for a first application, a number of physical central processing unit (CPU) cores and respective quantities of one or more additional physical resources needed to satisfy the first SLA; select one or more of the service nodes that collectively have available the number of physical CPU cores and the respective quantities of the one or more additional physical resources wherein the one or more additional physical resources comprise a last level cache (LLC); allocate a first virtual machine on one of the selected service nodes for the first application; reserve the number of physical CPU cores and the respective quantities of the one or more additional physical resources on the selected service nodes for use by the first virtual machine such that no other virtual machines allocated on the service nodes can utilize the reserved resources.

Optionally, in any of the preceding embodiments, wherein the additional physical resource further comprise dynamic random access memory (DRAM) bandwidth, an L1 cache, an L2 cache, an L3 cache, a last level cache (LLC), or disk bandwidth.

Optionally, in any of the preceding embodiments, wherein after reserving the number of physical CPU cores and the respective quantities of the one or more additional physical resources, determine that performance of the first application does not satisfy the first SLA and, based thereon, reserving an additional physical CPU core or an additional physical resource for use exclusively by the first virtual machine.

Optionally, in any of the preceding embodiments, wherein the first virtual machine and the second virtual machine are allocated on a same service node.

Optionally, in any of the preceding embodiments, wherein the determining process may further include collecting parameters of the resources usage in executing the first application, comparing the collected parameters to the first SLA; and calculating predicted resources needed for the first application; wherein the predicted resources comprise the number of physical central processing unit (CPU) cores and respective quantities of the one or more additional physical resources needed to satisfy the first SLA.

Optionally, in any of the preceding embodiments, wherein reserve all necessary physical resources as well as virtual resources exclusively for the first application.

An example embodiment includes a system for allocating resources in a network of computing service nodes to applications, a controller in a service node, configured to determine based on a first service level agreement (SLA) for a first application, a number of physical central processing unit (CPU) cores and respective quantities of one or more additional physical resources needed to satisfy the first SLA; select one or more of the service nodes that collectively have available the number of physical CPU cores and the respective quantities of the one or more additional physical resources wherein the one or more additional physical resources comprise a last level cache (LLC); allocate a first virtual machine on one of the selected service nodes for the first application; a memory in one or more service nodes of the network storing instructions; and one or more processors in the one or more service nodes of the network coupled to the memory, wherein the one or more processors execute the instructions to: reserve the number of physical CPU cores and the respective quantities of the one or more additional physical resources on the selected service nodes for use exclusively by the first virtual machine; and allocate a second virtual machine on one of the selected service nodes for a second application wherein the second virtual machine cannot utilize the reserved CPU cores and cannot utilize the reserved quantities of the additional of physical resources.

Optionally, in any of the preceding embodiments, wherein the additional physical resource further comprise dynamic random access memory (DRAM) bandwidth, an L1 cache, an L2 cache, an L3 cache, a last level cache (LLC), or disk bandwidth.

Optionally, in any of the preceding embodiments, wherein after reserving the number of physical CPU cores and the respective quantities of the one or more additional physical resources, determine that performance of the first application does not satisfy the first SLA and, based thereon, reserving an additional physical CPU core or an additional physical resource for use exclusively by the first virtual machine.

Optionally, in any of the preceding embodiments, wherein the first virtual machine and the second virtual machine are allocated on a same service node.

Optionally, in any of the preceding embodiments, wherein the controller further configured to reserve all necessary physical resources as well as virtual resources exclusively for the first application.

DETAILED DESCRIPTION

Figure 1:
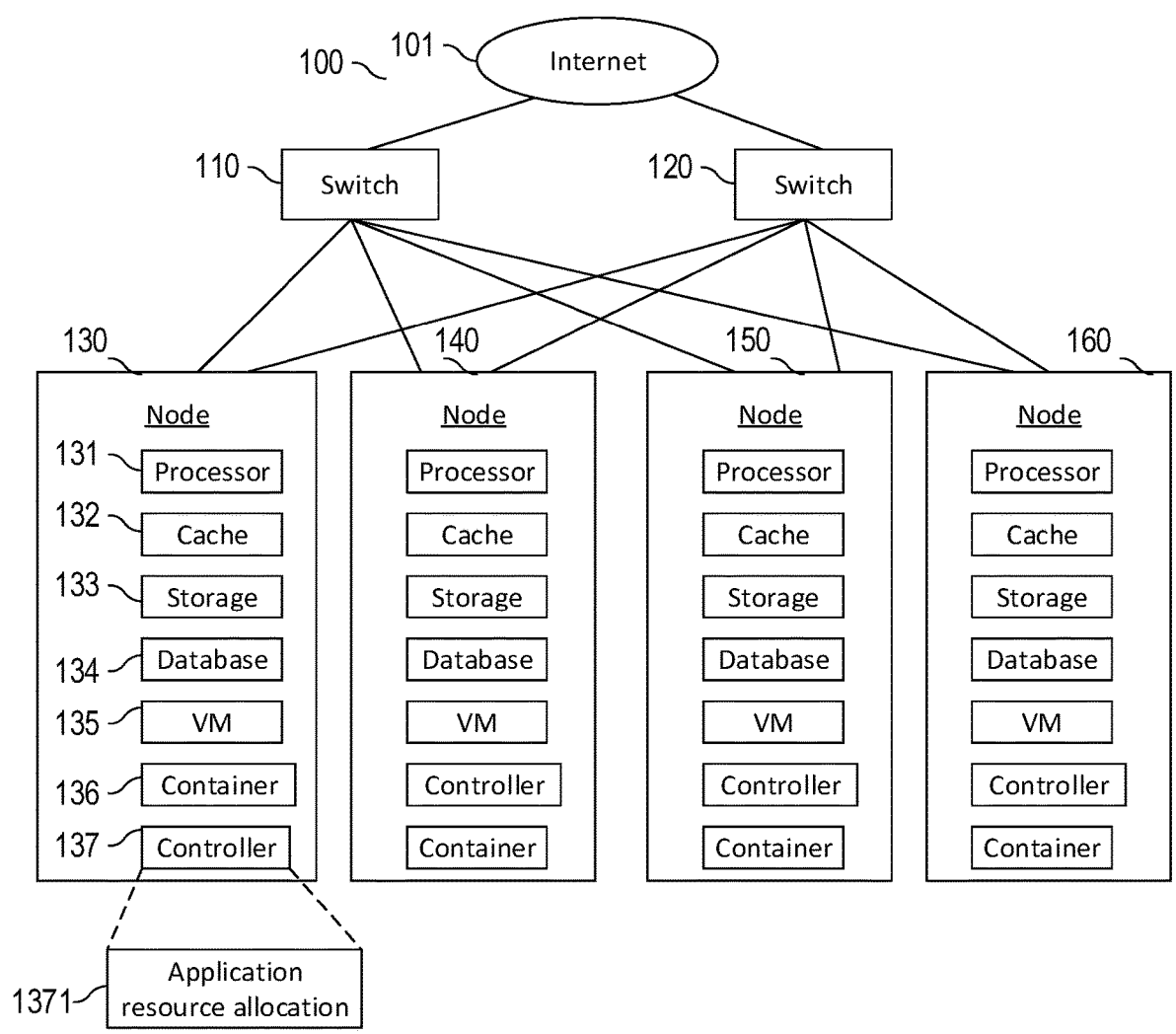
FIG. 1 shows a block diagram of a cloud infrastructure including a plurality of computing nodes in existing art.

Reference will now be made in detail to embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the embodiments may be practiced without these specific details or that various changes and substitutions can be made thereto without departing from the spirit and scope of the present disclosure. In other instances, well-known methods, procedures, components, and circuits have not been described in detail so as not to unnecessarily obscure aspects of the embodiments.

A resource in a network of computing services may include physical resource and logical resource. A resource of a cloud infrastructure may include such as physical servers, virtual machines (VMs), physical central processing units (CPUs), virtual CPU, memory, storage database, disk and even cache, etc. Additional resource may include dynamic random access memory (DRAM) bandwidth, an L1 cache (L1), an L2 cache (L2), an L3 cache (L3), a last level cache (LLC), disk bandwidth or a Network bandwidth.

A virtual machine (VM) is an operating system or application environment that is installed based on software, which imitates dedicated hardware. A specialized software may enable the VM to utilize resources such as CPU, memory, disk, etc. The specialized software may be referred to as an agent.

Cloud computing aims to provide distributed processing, parallel processing and grid computing together. User data may not be stored locally but is stored in the data center of internet in a network of computing service. The users can access the stored data at any time by using an Application Programming Interface (API) provided by cloud providers through any terminal equipment connected to the internet. The cloud providers could manage and maintain the operation of these data centers. As multi-tenancy cloud service emerges, cloud management system (CMS) takes responsibility of managing resources of cloud infrastructure and provisioning the computing instances for tenants or users. Taking an in-depth analysis from the perspective of cloud resources, it could be provisioned based on service level agreements (SLAs), claiming the reservation of certain resource quantity and quality.

A service-level agreement (SLA) may be an agreement or a contract between two or more parties. A party of the SLA may be a client, and the other party may be a service provider. A SLA may include various aspects of requirement for service, such as quality of service, requests being accepted per second, network latency, time taken to complete a certain task, time taken to recover after an outage of service, network bandwidth etc.

Usually, SLAs span across the cloud computing for shared resources, and are offered by service providers as a service-based agreement rather than a customer-based agreement. Measuring, monitoring and reporting on cloud performance is based on the end user or their ability to consume resources.

FIG. 1 shows a block diagram of a cloud infrastructure including a plurality of computing nodes in existing art. The cloud infrastructure 100 includes a plurality of service nodes 130, 140, 150, 160 interconnected via network switches 110, 120 for a data center internet 101. The switches 110, 120 may deploy resource for a specific application on a selected service node. A service node 130, 140, 150, 160 is an entity that gathers a plurality of resources in a network that provides computing services. A network of computing services may include a plurality of service nodes. Different service nodes may be configured with different resource capabilities. For example, the service node 130 may include a microprocessor 131, a cache 132, storage 133, a database 134, and virtual resources such as one or more virtual machines (VMs) 135, one or more containers 136. A controller 137 may be configured on one or more service nodes in the network that provides computing service. The controller 137 may allocate resource 1371 for different applications that run on at least one of the plurality of service nodes.

Figure 2:
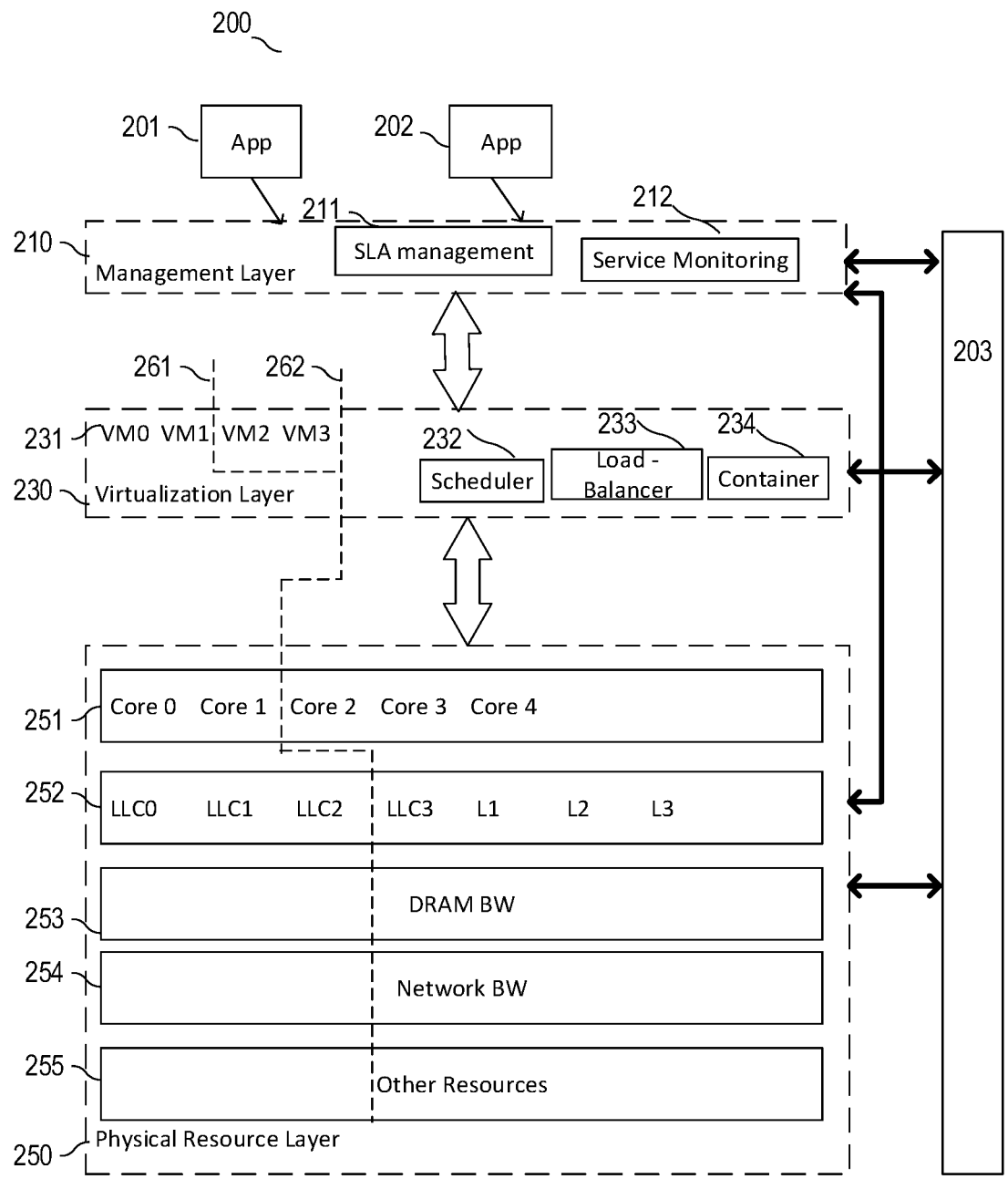
FIG. 2 depicts abstraction model layers of a cloud service structure according to an embodiment of the present disclosure.

FIG. 2 depicts abstraction model layers of a cloud service structure according to an embodiment of the present disclosure. A set of functional abstraction layers provided by cloud computing environment 200 is shown. It should be understood that the components, layers, and functions shown are intended to be illustrative only and embodiments of the invention are not limited thereto. As depicted, the following layers and corresponding functions are provided.

A specific application programs 201, 202 are to be handled by the cloud system as service requests.

A management layer 210 may include components of SLA management 211 and service monitoring 212. The management layer 210 may provide the functions described herein. Resource provisioning provides dynamic procurement of computing resources and other resources that are utilized to perform tasks within the cloud computing environment. The SLA management 211 provides cloud computing resource allocation requirements, for example, requests per second, network latency, DRAM bandwidth, disk bandwidth or Network bandwidth. The SLA management 211 may also provide cloud computing resources for which a future requirement is anticipated in accordance with an SLA. The SLA management 211 may provide basis to check if required service levels are met. Service monitoring 212 may track as resources are utilized within the cloud computing environment, and consumption of the resources.

A virtualization layer 230 may include a plurality of virtual machines (VMs) 231 (VM0, VM1, VM2, VM3), a scheduler 232, a load-balancer 233, a plurality of containers 234, virtual servers 235 (not shown in the figure), a virtual storage 236 (not shown in the figure), a controller 237 (not shown in the figure), etc. The controller 237 may be configured on a centralized service node which communicates with a plurality of other service nodes for resource allocation on the plurality of the other service nodes as well as on the centralized service node. The controller 237 may be configured on a switch with the similar functioning as it's configured on the centralized service node. The switch may be a switch 110, 120 as described in FIG. 1. The switches 110, 120 or the controller 237 or the scheduler 232 may allocate resource for a specific application on a selected service node. The controller 237 may direct the scheduler 232 to perform the allocation. The scheduler 232 may be configured on a service node or another computing device.

A physical resource layer 250 may reside collectively on the one or more service nodes of the network of cloud service structure. The physical resource layer 250 may include a plurality of physical central processing unit (CPU) cores 251 (core 0, core 1, core 2, core 3, core 4), a plurality of caches 252, for example, a level 1 (L1) cache, a level 2 (L2) cache, a level 3 (L3) cache, a last level cache (LLC), dynamic random access memory (DRAM) 253, Network bandwidth 254, and other resources 255. Other resources 255 may be for example DRAM bandwidth, disk bandwidth etc.

The various layers of the cloud system structure may be communicated with a plurality of functioning modules 203 such as a dashboard by a client, a third party notification service, a monitoring system etc.

User-facing services such as social media, search engines, software-as-a-service, online maps, webmail, machine translation, online shopping and advertising are typically scaled across thousands of servers and access distributed state stored in memory across these servers. While their load varies significantly due to diurnal patterns and unpredictable spikes in user accesses, such user-facing services are also latency-critical (LC). To guarantee resource usage, currently a lot more resource reservation is made for a service application to avoid the worst case, but it actually wastes resources because the network performance is not stable in a virtual environment. Reusing those resources for other tasks is rarely done in production services since the contention for shared resources can cause latency spikes that violate the service-level objectives of latency-sensitive tasks. The resulting under-utilization hurts both the affordability and energy-efficiency of large-scale data centers.

An embodiment of the present disclosure is provided based on FIG. 2 for a full stack isolation solution on cloud resource allocation. By applying the solution, resource usage may be improved because much less resource reservation for a first application is needed comparing to existing art. The full stack isolation solution means the isolation scheduling may be carried out through all layers of resources. For example, a resource for cloud service may include physical resources of CPU cores, cache, memory, memory bandwidth, DRAM bandwidth, disk bandwidth and/or virtual resources of virtual machines, virtual CPU cores, scheduler, etc. Network bandwidth may be defined as a physical resource or virtual resource. In another way of saying a full stack isolation solution is, entire layers of cloud resources including physical resources and/or virtual resources that are needed for executing the first application are configured exclusively to meet with the same SLA. Applications other than the first application will not be scheduled on the resources that have been configured exclusively for the first application until the isolated resources are released.

For example, based on a specific application 201, 202, with the following requirements in a SLA:

SLA Spec:
"RequestPerSecond": 500,
"Latency": 99.9%, <130 ms

Based on the SLA Spec, how much resource might be needed to achieve such requirements is calculated. Such resources needed might be for example:

App: 1
Core: 2
LLC: three-way cache
DRAM BandWidth;
Disk Bandwidth;
Network bandwidth, etc.

Such resource requirements are sent to controller 237 on a master node for example node 160 at FIG. The controller 237 checks with an agent which locates resource information on each node and selects a proper node with available resources based on an existing algorithm. The proper node may be configured as VM 0 on physical machine 0. The controller 237 may be integrated with a scheduler 232 function, for example to use a scheduler 232 extension is used and a query through a defined API, such as a REST API, may be received.

Additionally, two CPU cores (core 0, core 1) 251 and three LLC (LLC 0, LLC 1, LLC 2) 252 are selected, a hardware isolation is performed to pin the selected three LLCs on the selected two CPU cores (core 0, core 1) 251. The isolation can be carried out based on a hardware-support technique such as Intel®'s server chip with Cache allocation Technique (CAT).

At the virtualization layer 230, two virtual CPU cores 231, such as VM 2 and VM 3 are isolated and pinned to the selected two CPU cores (core 0, core 1) 251.

At the physical resource layer 250, other resource are isolated and bound to the selected two CPU cores (core 0, core 1) 251. For example, DRAM bandwidth usage is monitored and, if other cores (core 2, core 3) use too much DRAM bandwidth, then applications which use too much DRAM bandwidth on the other cores (core 2, core 3) are paused or killed to guarantee the DRAM bandwidth usage for the selected cores (core 0, core 1). For example, Network bandwidth is monitored and traffic control is used to allocate enough Network bandwidth for the selected CPU cores (core 0, core 1), when the Network bandwidth is consumed too much by other cores (core 2, core 3), the traffic control may drop packet from the other cores (core 2, core 3). Optionally, the Network bandwidth may be controlled through transmit rate limiting in a Linux kernel with a hierarchical token bucket.

The specific application 201, 202 is run on the virtual CPU cores (VM 2, VM 3), and it runs on the two selected physical CPU cores (core 0, core 1) because the selected virtual CPU cores (VM 2, VM 3) are pinned on the two selected physical CPU cores (core 0, core 1).

Other application than the specific application 201, 202 is scheduled on other cores 251 (core 2, core 3) than the two selected physical CPU cores (core 0, core 1).

Preferably, one application with a SLA is isolated with an exclusive physical CPU core and exclusive LLCs, and exclusive DRAM bandwidth, and exclusive disk bandwidth and exclusive Network bandwidth. The dotted lines 261, 262 briefly shows an example of resource isolation for the specific application 201, 202 as described above.

Figure 3:
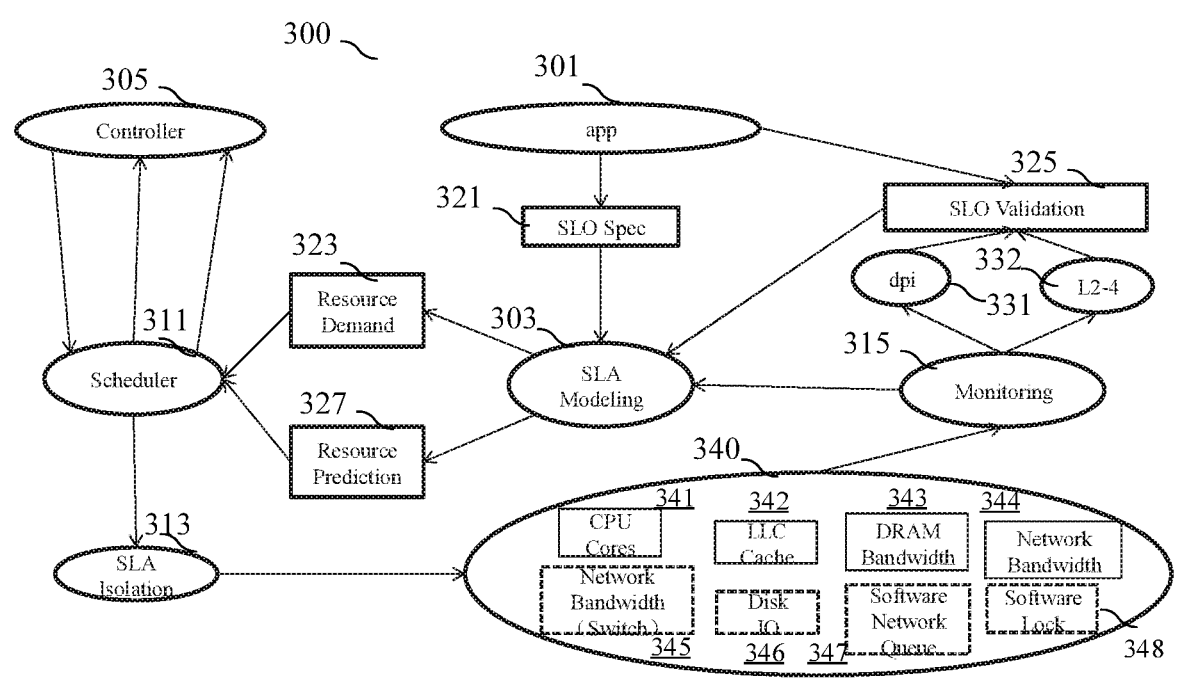
FIG. 3 shows a flowchart of a resource allocation process for a full stack isolation solution on cloud resource allocation.

FIG. 3 shows a flowchart 300 of a resource allocation process for a full stack isolation solution on cloud resource allocation. The process may also be with respect to FIG. 2.

Specification requirements as defined in a SLA for a first application 301 may be listed as a service level objective (SLO) spec 321 which is a key element of a SLA between a service provider and a customer. Usually SLOs are agreed upon as a means of measuring the performance of the service provider. A SLO spec example may be for example:

"Spec": "{"AppName": "mysql",
"AppId": 2,
"RequestPerSecond": 500,
"ConcurrentUsers": 4,
"ConnectionsPerUser":10,
"Latency": 130}"

Based on the SLO spec 321 defined for the first application 301, resource estimation 327 is calculated for the first application 301 at a SLA modeling function module 303, the resource estimation 327 and resource demand 323 as well as the SLO spec information 321 are sent to a controller 305. The controller 305 may comprise a scheduler 311. The scheduler 311 or the controller 305 selects a suitable node or nodes which may be available to meet the resource requirements according to the SLO spec info 321. The controller 305 may be configured on a centralized service node which communicates with a plurality of other service nodes for resource allocation on the plurality of the other service nodes as well as on the centralized service node.

Resource isolation 313 is performed according to the SLO spec info 321 by the controller 305. The first application 301 is run on the isolated resource only.

A monitor or a monitoring system 315 collects resource usage and statistics of the first application 301. The resource usage and statistics are collected from resources 340 such as physical CPU cores 341, LLC cache 342, DRAM bandwidth 343, Network bandwidth as host 344, Network bandwidth as switch 345, disk I/O 346, software network queue 347, software lock 348, etc. Network bandwidth may be defined as a virtual resource or a physical resource. Network bandwidth may be an element resource as part of the full stack structure isolation or may not be.

A network SLO report by a SLO validation calculation module 325 or a deep package impaction (DPI) report 331 may be used by the monitoring system 315 to calculate statistics of the first application executing. Reports of L2, L3, LLC (L4) 332 may be generated and sent to a SLO validation module 325 to input for the network SLO report.

A SLO validation result 325 and resource usage information may also be collected by the monitor 315 to input as a machine learning parameters. A Kernel Canonical Correlation Analysis (KCCA) algorithm may be used for the monitoring system 315 to learn or predict resource needed for an application to meet with specific requirements of a SLA. For example, the monitoring system 315 may include a couple of models as a basis for resource learning and prediction; a model may profile an application's performance based on different resource isolation stacks under different workload; a mapping of performance and isolated resources for each application may also be generated to get a profile of possible resource operation of all applications; the SLA spec info 321 is considered by the monitoring system 315 to predict how much isolated resources needed for the specific application 201, 202, 301; a suitable service node is scheduled to run the specific application 201, 202, 301; performance and resource usage is monitored, and a model is selected for further checking; when the SLA requirements are not met or when it is needed, resource is recalculated and the executing for the specific application is rescheduled on the reallocated resource. Such process may be repeated.

Then the resource allocation may be adjusted or improved based on the collected results of learning. If the resource usage information shows the SLO spec requirements are not fulfilled, a resource allocation may be updated, and the collected results of learning may be as a basis for the update. By doing the update of the resource allocation, a new service node may be scheduled and the process of resource allocation isolation may be repeated as stated in above various embodiments.

By providing full stack resource isolation as described in above various embodiments, it makes the network performance much more stable and predictable in virtual environment such as cloud. It may also benefit both software and hardware design.

Figure 4:
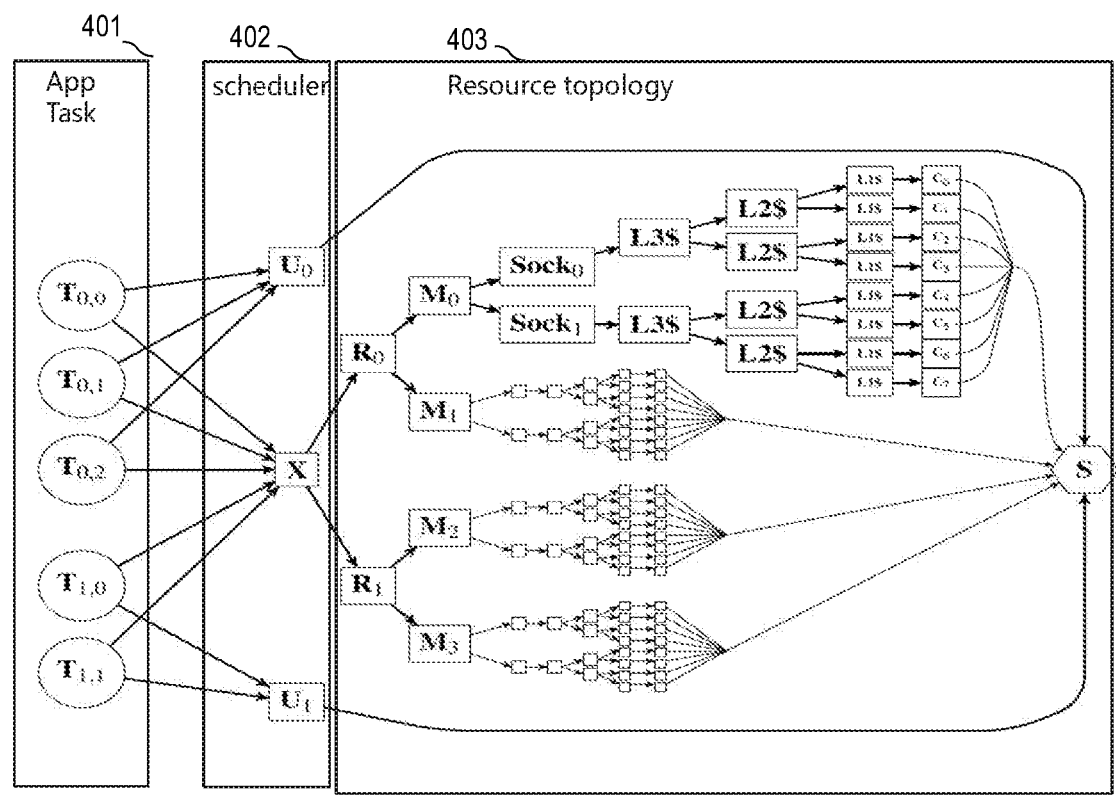
FIG. 4 shows a resource topology example according to an embodiment of the present disclosure.

FIG. 4 shows a resource topology example for resource isolation solution provided herein. Tasks of applications 401 are shown in FIG. 4 as $T_{0,0}$, $T_{0,1}$, $T_{0,2}$, $T_{1,0}$, $T_{1,1}$. The tasks of applications are to be scheduled 402 based on their different SLA requirements by a controller (X) or a scheduler ($U_0$, $U_1$). Resource allocation topology 403 of all needed physical resources may be the example as shown by FIG. 4. The needed physical resources may be for example:

R ($R_0$, $R_1$): a Rack, represents where the resource physically locates.

M ($M_0$, $M_1$, $M_2$, $M_3$): a physical machine that is selected for the application task.

Sock ($Sock_0$, $Sock_1$): CPU socket, represents where CPU is located that has been selected for the application task.

L3 (L3$): Level 3 cache, usually last level cache (LLC).

L2 (L2$): Level 2 cache.

L1 (L1$): Level 1 cache.

C ($C_0$, $C_1$, $C_2$, $C_3$, $C_4$, $C_5$, $C_6$, $C_7$): core, represents which CPU core is selected for the application task.

S: Sink, this may also be a monitor on services.

The controller 402 may have all resource topology as such and isolation schedules. Suitable node with available resources to deploy for a specific application with SLA may thus be switched or selected.

Figure 5:
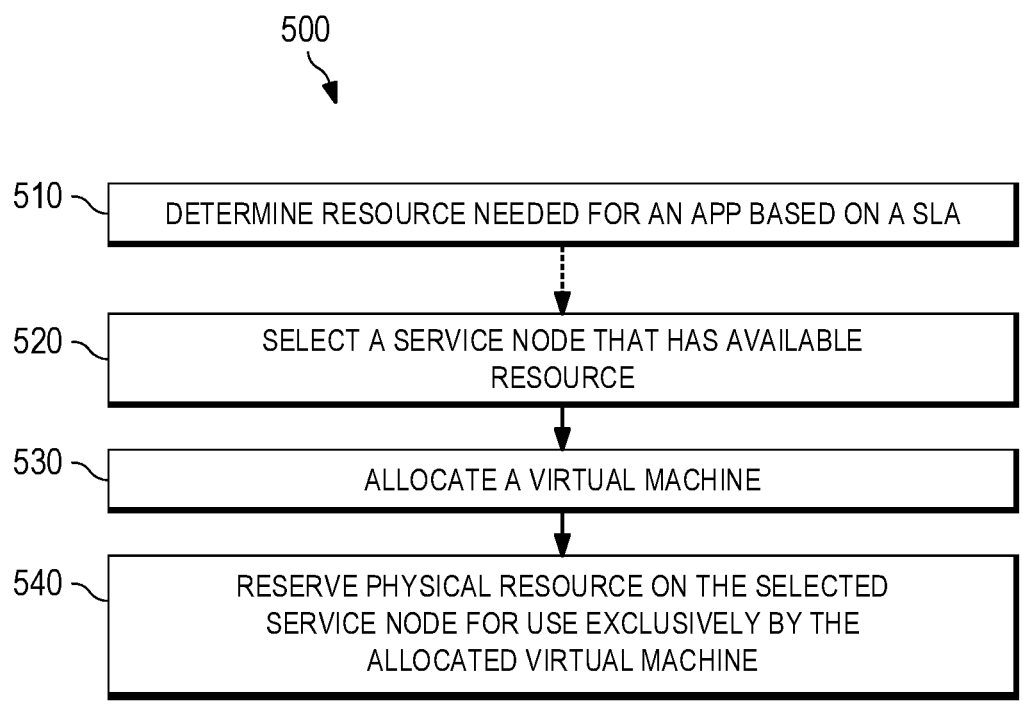
FIG. 5 is a flow chart example of allocating resources in a network of computing service nodes to applications.

FIG. 5 is a flow chart example 500 of allocating resources in a network of computing service nodes to applications. The steps 500 can be performed by the controller, for example. At step 510, based on a first service level agreement (SLA) for a first application, a number of physical central processing unit (CPU) cores and respective quantities of one or more additional physical resources needed are determined to satisfy the first SLA; such resource determination may be done before the allocating starts, or the resource determination may be carried out again during processing of the first application. At step 520, one or more of the service nodes are selected that collectively have available the number of physical CPU cores and the respective quantities of the one or more additional physical resources wherein the one or more additional physical resources comprise a last level cache (LLC); at step 530, a first virtual machine on one of the selected service nodes is allocated for the first application; at step 540, the number of physical CPU cores and the respective quantities of the one or more additional physical resources on the selected service nodes are reserved for use exclusively by the first virtual machine; and optionally, a second virtual machine on one of the selected service nodes for a second application is allocated wherein the second virtual machine cannot utilize the reserved CPU cores and cannot utilize the reserved quantities of the additional of physical resources. The second virtual machine may be reallocated to the resource that has been reserved for the first virtual machine when the reserved resource is released. The first virtual machine and the second virtual machine may be allocated on a same service node.

The resource usage needed may be carried out by collecting parameters of the resources when executing the first application, comparing the collected parameters to the first SLA; calculating predicted resources needed for the first application; wherein the predicted resources include the number of physical central processing unit (CPU) cores and respective quantities of the one or more additional physical resources needed to satisfy the first SLA. The resource usage may be recalculated for the first application; former resources allocation may be released to be available by the second virtual machine or a second application; and resources based on the results of the recalculation may be reallocated in addition to the first SLA.

The SLA may specify at least one of requests per second, network latency, DRAM bandwidth, disk bandwidth or Network bandwidth.

After reserving the number of physical CPU cores and the respective quantities of the one or more additional physical resources at step 540, if performance of the first application does not satisfy the first SLA and, based thereon, an additional physical CPU core or an additional physical resource is determined for use exclusively by the first virtual machine.

All necessary physical resources may be reserved as well as virtual resources exclusively for the first virtual machine or for the first application.

Figure 6:
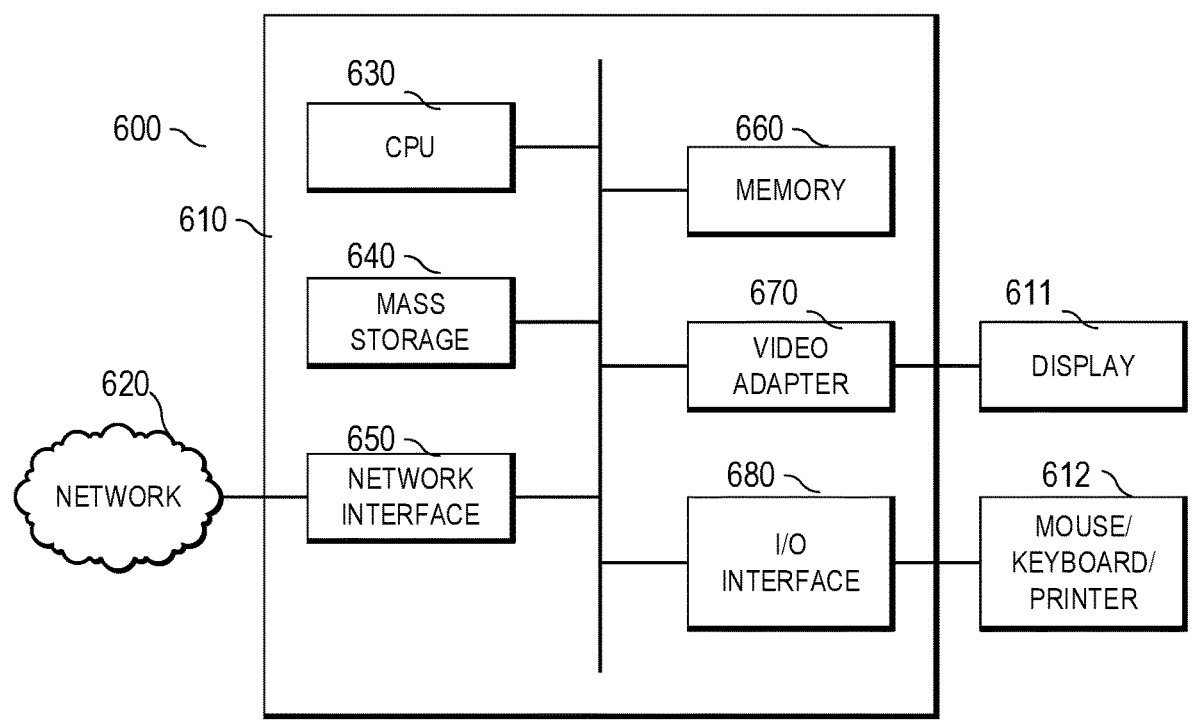
FIG. 6 is a block diagram of a processing system that may be used for implementing the devices and methods disclosed herein.

FIG. 6 is a block diagram of a processing system 600 that may be used for implementing the system, apparatuses, devices, and methods disclosed herein.

Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 610 equipped with one or more input/output devices, such as a speaker, microphone, mouse, touchscreen, keypad, keyboard, printer, display, and the like. The processing unit 610 may include a central processing unit (CPU) 630, memory 660, a mass storage device 640, a video adapter 670, and an I/O interface 680 connected to a bus.

The bus may be one or more of any type of several bus architectures including a memory bus or memory controller, a peripheral bus, video bus, or the like. The CPU 630 may comprise any type of electronic data processor. The memory 660 may comprise any type of system memory such as static random access memory (SRAM), dynamic random access memory (DRAM), synchronous DRAM (SDRAM), read-only memory (ROM), a combination thereof, or the like. In an embodiment, the memory 660 may include ROM for use at boot-up, and DRAM for program and data storage for use while executing programs.

The mass storage device 640 may comprise any type of storage device configured to store data, programs, and other information and to make the data, programs, and other information accessible via the bus. The mass storage device 640 may comprise, for example, one or more of a solid state drive, hard disk drive, a magnetic disk drive, an optical disk drive, or the like.

The video adapter 670 and the I/O interface 680 provide interfaces to couple external input and output devices to the processing unit 610. As illustrated, examples of input and output devices include the display 611 coupled to the video adapter 670 and the mouse/keyboard/printer 612 coupled to the I/O interface 680. Other devices may be coupled to the processing unit 610, and additional or fewer interface cards may be utilized. For example, a serial interface card (not shown) may be used to provide a serial interface for a printer.

The processing unit 610 also includes one or more network interfaces 650, which may comprise wired links, such as an Ethernet cable or the like, and/or wireless links to access nodes or different networks 620. The network interface 650 allows the processing unit 610 to communicate with remote units via the networks 620. For example, the network interface 650 may provide wireless communication via one or more transmitters/transmit antennas and one or more receivers/receive antennas. In an embodiment, the processing unit 610 is coupled to a local-area network or a wide-area network for data processing and communications with remote devices, such as other processing units, the Internet, remote storage facilities, or the like.

Figure 7A:
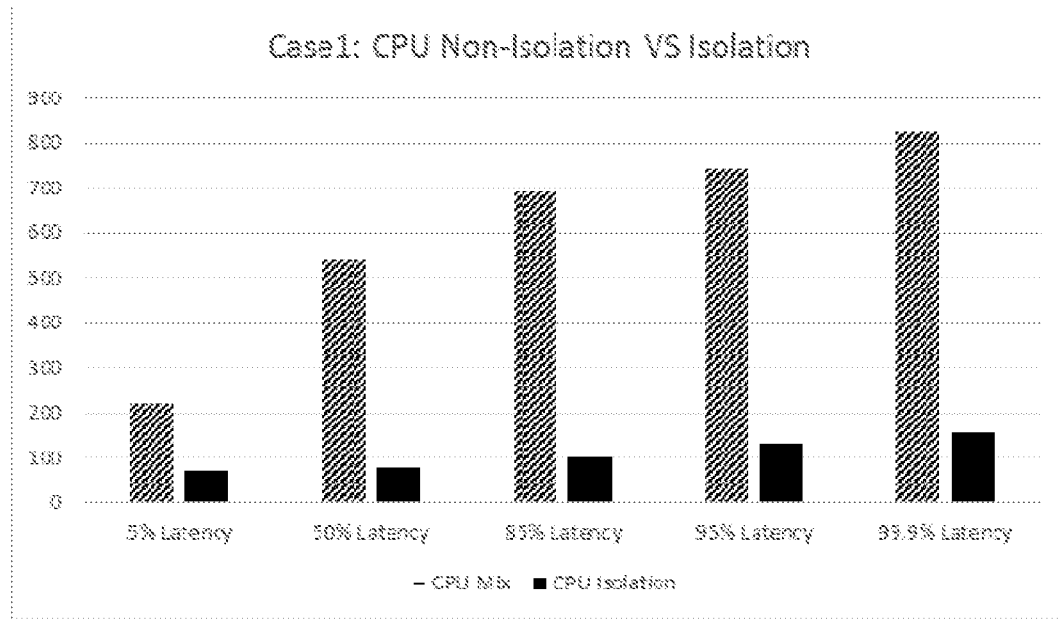
FIGS. 7A and 7B show a simulation comparison result for a test case 1 and a test case 2 respectively with resource isolation and without resource isolation.

FIG. 7A shows a simulation comparison result for a test case 1 with resource isolation and without resource isolation. The result is a column figure directly generated from below table 1 for an easy reference showing only. In the test case 1, a first application with SLA has 10 users, 50 query per second (QPS) at the same time, and a second application without SLA has 100 users, 1500 QPS. The table 1 shows numbers of latency ratio comparison for case 1, one column shows latency ratio numbers when the CPU resource allocation is mixed for both applications (CPU Mix). Another column shows latency ratio numbers when the CPU resource allocation is isolated for the first application with SLA (CPU Isolation). The far right column shows a ratio from the numbers listed in both columns of CPU Mix with CPU Isolation (Speedup×times). The performance has improved at least 3.1 times approximately for an isolation case comparing to one without isolation.

TABLE 1

| Case 1 (ms) | CPU Mix | CPU Isolation | Speedup x times |
|---|---|---|---|
| 5% Latency | 221 | 72 | 3.1 |
| 50% Latency | 540 | 77 | 7.0 |
| 85% Latency | 692 | 102 | 6.8 |
| 95% Latency | 742 | 131 | 5.7 |
| 99.9% Latency | 826 | 156 | 5.3 |

Figure 7B:
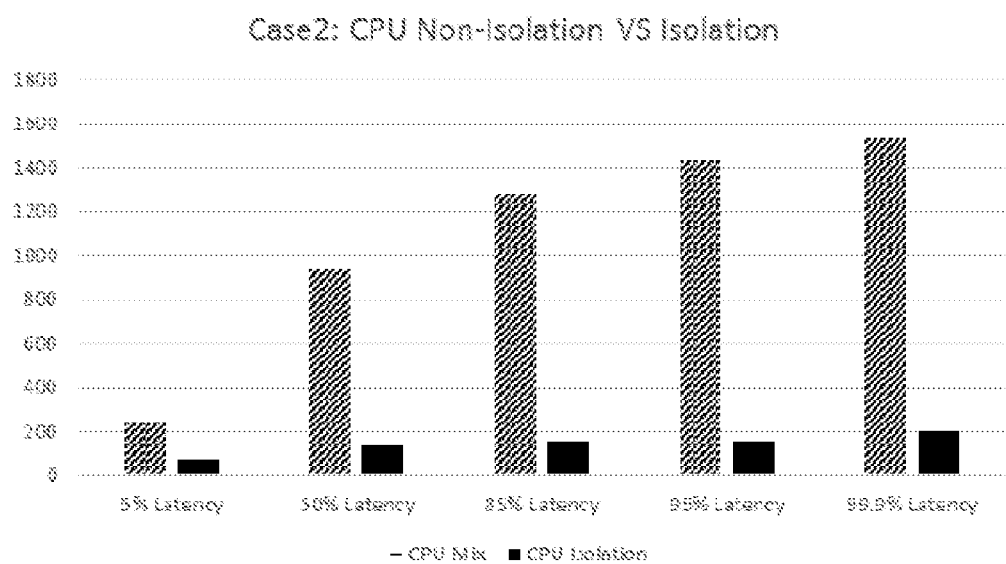

FIG. 7B shows a simulation comparison result for a test case 2 with resource isolation and without resource isolation. The result is a column figure directly generated from below table 2 for an easy reference showing only. In the test case 2, a first application with SLA has 20 users, 50 QPS at the same time, and a second application without SLA has 100 users, 1000 QPS at the same time. The table 2 shows numbers of latency ratio comparison for case 2, one column shows latency ratio numbers when the CPU resource allocation is mixed for both applications (CPU Mix). Another column shows latency ratio numbers when the CPU resource allocation is isolated for the first application with SLA (CPU Isolation). The far right column shows a ratio from the numbers listed in both columns of CPU Mix with CPU Isolation (Speedup×times).

TABLE 2

| Case 2 (ms) | CPU Mix | CPU Isolation | Speedup x times |
|---|---|---|---|
| 5% Latency | 245 | 77 | 3.2 |
| 50% Latency | 946 | 135 | 7.0 |
| 85% Latency | 1285 | 153 | 8.4 |
| 95% Latency | 1440 | 159 | 9.1 |
| 99.9% Latency | 1540 | 204 | 7.5 |

The performance has improved at least 3.2 times approximately for an isolation case comparing to one without isolation.

Although the present disclosure has been described with reference to specific features and embodiments thereof, it should be understood that various changes and substitutions can be made thereto without departing from the spirit and scope of the present disclosure as defined by the following claims.

What is claimed is:

1. A method for allocating resources to applications in a network of computing service nodes, the allocating implemented by a controller, the method comprising:

determining, based on a first service level agreement (SLA) for a first application, a number of physical central processing unit (CPU) cores associated with the network of computing service nodes and respective quantities of one or more additional physical resources needed to satisfy the first SLA;

selecting a plurality of the computing service nodes from the network of computing service nodes, the plurality of the computing service nodes collectively having available the number of physical CPU cores and the respective quantities of the one or more additional physical resources needed to satisfy the first SLA, wherein the one or more additional physical resources comprise a last level cache (LLC) and the one or more additional physical resources are isolated and bound to the number of physical CPU cores associated with the plurality of the computing service nodes;

allocating a first virtual machine on one of the selected plurality of computing service nodes for the first application;

reserving resources comprising reserving the number of physical CPU cores and the respective quantities of the one or more additional physical resources on the selected plurality of computing service nodes for use by the first virtual machine, such that the number of physical CPU cores and the respective quantities of the one or more additional physical resources satisfy the first SLA and no other virtual machine allocated on the selected plurality of computing service nodes can utilize the reserved resources; and pausing execution of a second application executing on one or more additional physical CPU cores, the one or more additional physical CPU cores being separate from the reserved number of physical CPU cores and the pausing performed based on usage of the one or more additional physical resources by the second application.

2. The method of claim 1, wherein the one or more additional physical resources further comprise dynamic random access memory (DRAM), an L1 cache, an L2 cache, an L3 cache, or disk bandwidth.

3. The method of claim 1, wherein the first SLA specifies one or more of:
requests per second, network latency, DRAM bandwidth, disk bandwidth, or network bandwidth.

4. The method of claim 1, further comprising:
after reserving the number of physical CPU cores and the respective quantities of the one or more additional physical resources, determining that performance of the first application does not satisfy the first SLA and, based thereon, reserving an additional physical CPU core or an additional physical resource within the selected plurality of computing service nodes for use exclusively by the first virtual machine.

5. The method of claim 1, wherein the first virtual machine and a second virtual machine for the second application are allocated on a same service node of the selected plurality of computing service nodes, wherein the second virtual machine is restricted from utilizing the number of physical CPU cores and the respective quantities of the one or more additional physical resources reserved at the same service node for the first application.

6. The method of claim 1, wherein the determining, based on the first SLA for the first application, of the number of physical CPU cores and respective quantities of the one or more additional physical resources needed to satisfy the first SLA further comprises:

collecting parameters of resources usage in executing the first application;
comparing the collected parameters to the first SLA; and
calculating predicted resources needed for the first application based on the comparing,
wherein the predicted resources comprise the number of CPU cores and the respective quantities of the one or more additional physical resources needed to satisfy the first SLA.

7. The method of claim 6, wherein the determining, based on the first SLA for the first application, the number of physical CPU cores and respective quantities of the one or more additional physical resources needed to satisfy the first SLA further comprises:
recalculating the predicted resources needed for the first application;
releasing a former resources allocation for the first application to be available to the second application; and
reallocating resources from the former resources allocation to the second application based on results of the recalculation in addition to the first SLA.

8. A controller apparatus allocating resources to applications in a network of computing service nodes, the apparatus comprising:
a memory storing instructions; and
one or more processors coupled to the memory, wherein the one or more processors execute the instructions to:
determine, based on a first service level agreement (SLA) for a first application, a number of physical central processing unit (CPU) cores associated with the network of computing service nodes and respective quantities of one or more additional physical resources needed to satisfy the first SLA;
select a plurality of the computing service nodes from the network of computing service nodes, the plurality of the computing service nodes collectively having available the number of physical CPU cores and the respective quantities of the one or more additional physical resources needed to satisfy the first SLA, wherein the one or more additional physical resources comprise a last level cache (LLC) and the one or more additional physical resources are isolated and bound to the number of physical CPU cores associated with the plurality of the computing service nodes;
allocate a first virtual machine on one of the selected plurality of computing service nodes for the first application;
reserve resources comprising reserve the number of physical CPU cores and the respective quantities of the one or more additional physical resources on the selected plurality of computing service nodes for use by the first virtual machine allocated for the first application, such that the number of physical CPU cores and the respective quantities of the one or more additional physical resources satisfy the first SLA and no other virtual machine allocated on the selected plurality of computing service nodes can utilize the reserved resources; and
pause execution of a second application executing on one or more additional physical CPU cores, the one or more additional physical CPU cores being separate from the reserved number of physical CPU cores and the pausing performed based on usage of the one or more additional physical resources by the second application.

9. The controller apparatus of claim 8, wherein the one or more additional physical resources further comprise dynamic random access memory (DRAM), an L1 cache, an L2 cache, an L3 cache, or disk bandwidth.

10. The controller apparatus of claim 8, wherein the one or more processors further execute the instructions to:
after reserving the number of physical CPU cores and the respective quantities of the one or more additional physical resources, determine that performance of the first application does not satisfy the first SLA and, based thereon, reserve an additional physical CPU core or an additional physical resource within the selected plurality of computing service nodes for use exclusively by the first virtual machine.

11. The controller apparatus of claim 8, wherein the first virtual machine and a second virtual machine for the second application are allocated on a same service node of the selected plurality of computing service nodes, wherein the second virtual machine is restricted from utilizing the number of physical CPU cores and the respective quantities of the one or more additional physical resources reserved at the same service node for the first application.

12. The controller apparatus of claim 8, wherein the one or more processors execute the instructions to determine, based on the first SLA for the first application, the number of physical CPU cores and respective quantities of the one or more additional physical resources needed to satisfy the first SLA further comprises the one or more processors executing the instructions to:
collect parameters of resources usage in executing the first application;
compare the collected parameters to the first SLA; and
calculate predicted resources needed for the first application based on the comparing,
wherein the predicted resources comprise the number of CPU cores and the respective quantities of the one or more additional physical resources needed to satisfy the first SLA.

13. The controller apparatus of claim 8, wherein the one or more processors further execute the instructions to:
reserve the number of physical CPU cores and the respective quantities of the one or more additional physical resources needed to satisfy the first SLA on the selected plurality of computing service nodes exclusively for the first application.

14. A computer-readable medium storing computer instructions for allocating resources to applications in a network of computing service nodes, wherein the instructions when executed by one or more processors of a first computing service node of the computing service nodes, cause the one or more processors to perform operations to:
determine, based on a first service level agreement (SLA) for a first application, a number of physical central processing unit (CPU) cores associated with the network of computing service nodes and respective quantities of one or more additional physical resources needed to satisfy the first SLA;
select a plurality of the computing service nodes from the network of computing service nodes, the plurality of the computing service nodes collectively having available the number of physical CPU cores and the respective quantities of the one or more additional physical resources needed to satisfy the first SLA, wherein the one or more additional physical resources comprise a last level cache (LLC) and the one or more additional physical resources are isolated and bound to the number of physical CPU cores associated with the plurality of the computing service nodes;

allocate a first virtual machine on one of the selected plurality of computing service nodes for the first application;

reserve resources comprising reserve the number of physical CPU cores and the respective quantities of the one or more additional physical resources on the selected plurality of computing service nodes for use by the first virtual machine allocated for the first application, such that the number of physical CPU cores and the respective quantities of the one or more additional physical resources satisfy the first SLA and no other virtual machine allocated on the selected plurality of computing service nodes can utilize the reserved resources; and pause execution of a second application executing on one or more additional physical CPU cores, the one or more additional physical CPU cores being separate from the reserved number of physical CPU cores and the pausing performed based on usage of the one or more additional physical resources by the second application.

15. The computer-readable medium of claim 14, wherein the one or more additional physical resources further comprise dynamic random access memory (DRAM), an L1 cache, an L2 cache, an L3 cache, or disk bandwidth.

16. The computer-readable medium of claim 14, wherein the instructions further cause the one or more processors to:
after reserving the number of physical CPU cores and the respective quantities of the one or more additional physical resources, determine that performance of the first application does not satisfy the first SLA and, based thereon, reserve an additional physical CPU core or an additional physical resource within the selected plurality of computing service nodes for use exclusively by the first virtual machine.

17. The computer-readable medium of claim 14, wherein the first virtual machine and a second virtual machine for the second application are allocated on a same service node of the selected plurality of computing service nodes, wherein the second virtual machine is restricted from utilizing the number of physical CPU cores and the respective quantities of the one or more additional physical resources reserved at the same service node for the first application.

18. The computer-readable medium of claim 14, wherein to determine, based on the first SLA for the first application, the number of physical CPU cores and respective quantities of the one or more additional physical resources needed to satisfy the first SLA, the instructions further cause the one or more processors to:
collect parameters of resources usage in executing the first application;
comparing the collected parameters to the first SLA; and
calculate predicted resources needed for the first application,
wherein the predicted resources comprise the number of CPU cores and the respective quantities of the one or more additional physical resources needed to satisfy the first SLA.

19. The computer-readable medium of claim 14, wherein the instructions further cause the one or more processors to:
reserve the number of physical CPU cores and the respective quantities of the one or more additional physical resources needed to satisfy the first SLA on the selected plurality of computing service nodes exclusively for the first application.

20. The computer-readable medium of claim 14, wherein the one or more additional physical resources further comprise dynamic random access memory (DRAM) bandwidth bound to the number of physical CPU cores, and wherein the instructions further cause the one or more processors to:
monitor usage of the DRAM bandwidth by the second application executing on the one or more additional physical CPU cores; and
pause execution of the second application based on the usage of the DRAM bandwidth exceeding a threshold value.

* * * * *